United States Patent [19]

Dunigan

[11] 4,104,986
[45] Aug. 8, 1978

[54] BIRD CAGE WITH TRANSPARENT SHIELD

[76] Inventor: Opal Dunigan, 2204 W. Hillmont, Odessa, Tex. 79762

[21] Appl. No.: 699,229

[22] Filed: Jun. 24, 1976

[51] Int. Cl.² .............................................. A01K 31/06
[52] U.S. Cl. ..................................................... 119/17
[58] Field of Search ...................... 119/23, 26, 17, 18, 119/19

[56] References Cited

U.S. PATENT DOCUMENTS

| 166,596 | 8/1875 | Edwards | 119/17 |
|---|---|---|---|
| 2,120,262 | 6/1938 | Rodess | 119/17 |
| 2,445,419 | 7/1948 | Brown | 119/17 |
| 2,693,786 | 11/1954 | Barbros et al. | 119/17 |
| 3,662,712 | 5/1972 | Singer | 119/19 |
| 3,815,549 | 6/1974 | Opmeer | 119/17 |

FOREIGN PATENT DOCUMENTS 1,239,649   7/1971   United Kingdom ...................... 119/17

Primary Examiner—Russell R. Kinsey
Assistant Examiner—Daniel J. Leach
Attorney, Agent, or Firm—Clarence A. O'Brien; Harvey B. Jacobson

[57] ABSTRACT

A bird cage of triangular configuration for positioning in the corner of a room or the like constructed of spaced, parallel, inclined wires extending between an imperforate bottom and an imperforate top with a removable central partition or floor being disposed intermediate the top and bottom to enable the cage to be converted from a two compartment cage to a single compartment cage. A transparent, plastic shield is provided on the front of the cage covering at least the upper compartment thereof to protect the bird from cold air and to protect the bird from germs such as may be discharged by humans in adjacent relation to the cage. The front of the cage is of arcuate configuration with a gate being provided to enable ingress and egress of the bird and one side wall of the cage is openable to facilitate cleaning of the cage and also facilitate access to the interior thereof.

5 Claims, 5 Drawing Figures

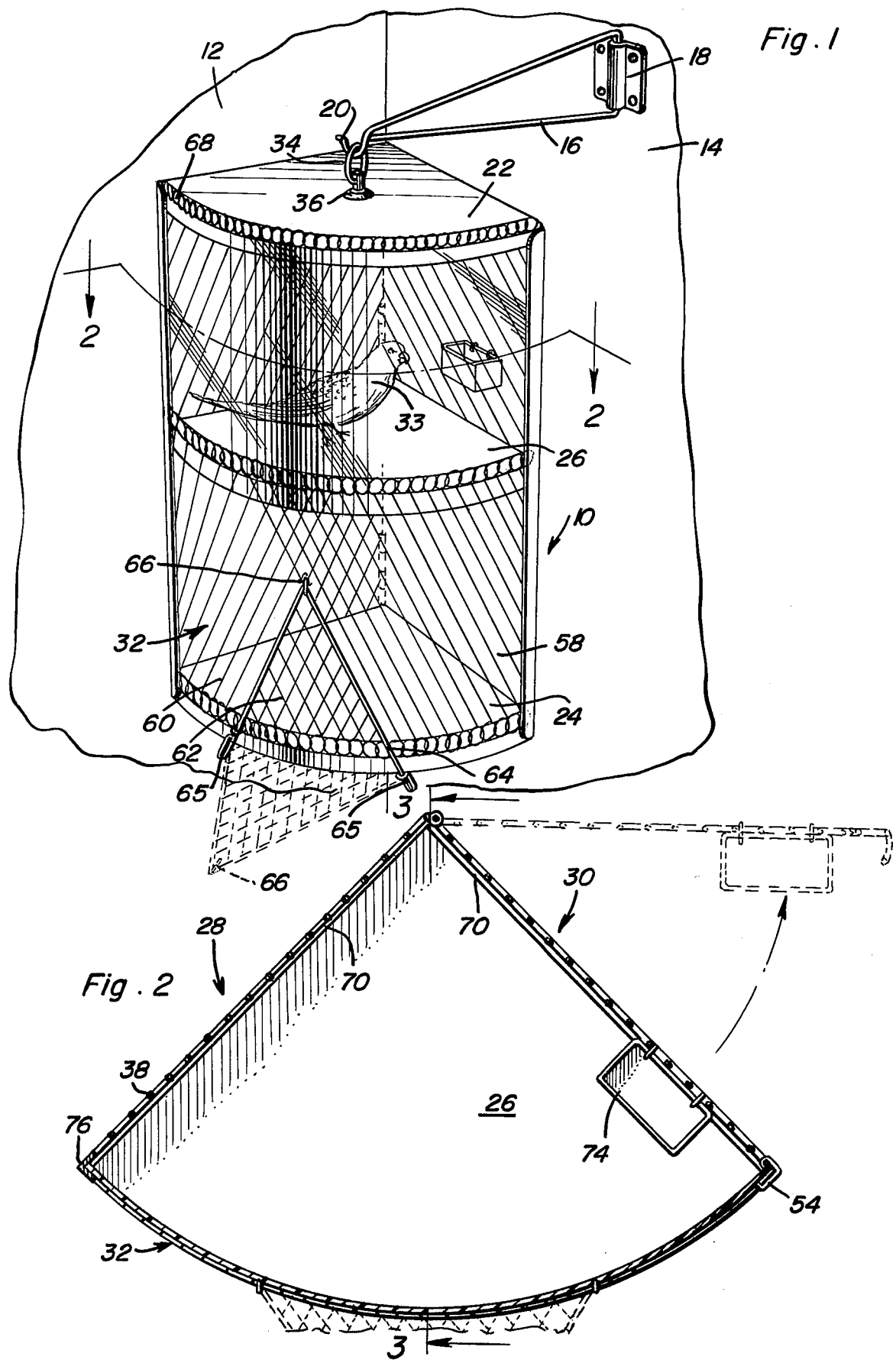

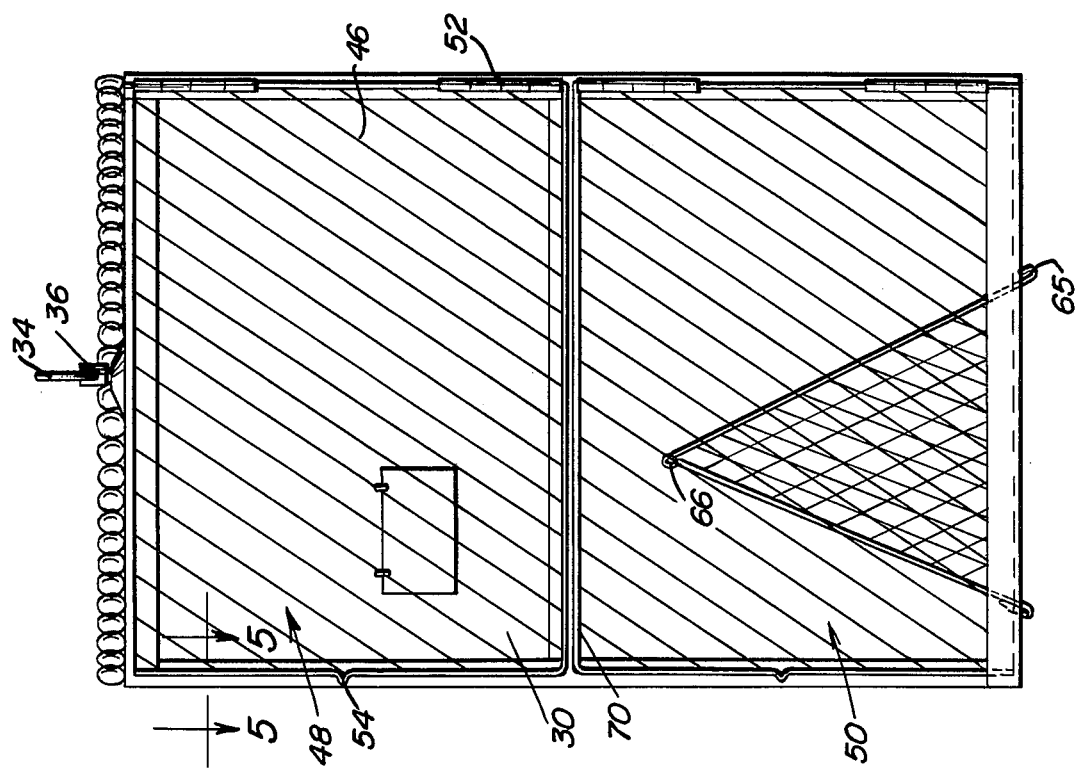
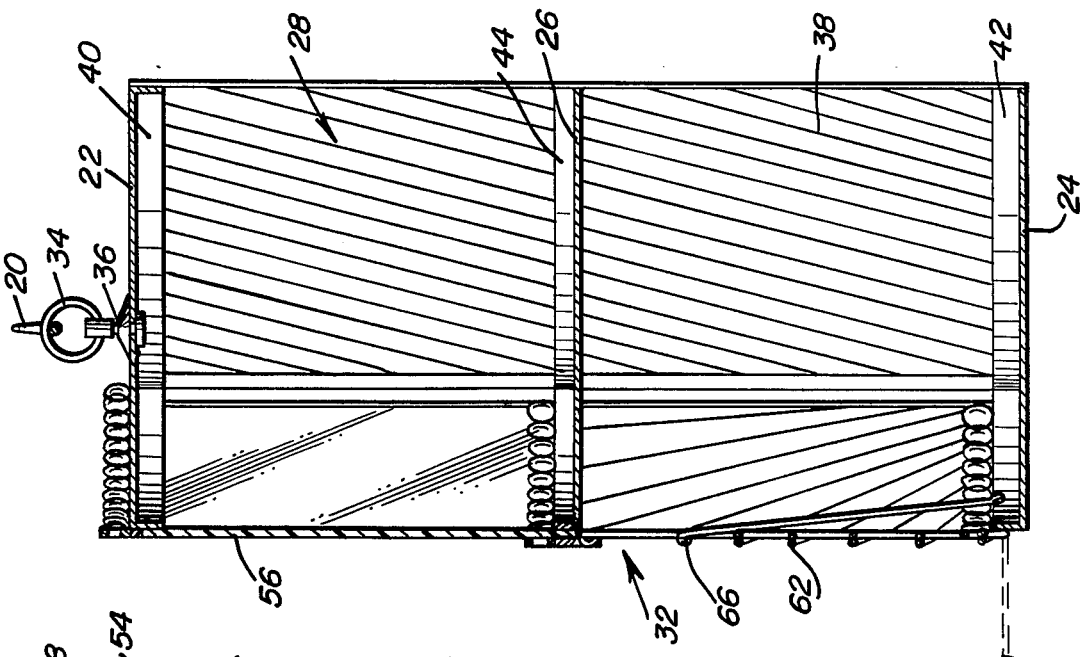
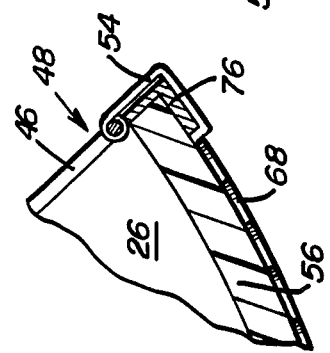
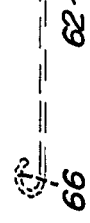

4,104,986

BIRD CAGE WITH TRANSPARENT SHIELD

BACKGROUND OF THE INVENTION

1. Field of the Invention

The present invention generally relates to a bird cage and more particularly a triangular bird cage to facilitate positioning of the cage in the corner of an enclosure with the cage including a transparent shield on the front portion thereof to protect the bird and to enable the bird to see out and enable others to see the bird.

2. Description of the Prior Art

Bird cages of various shapes and configurations are well known with such cages usually including an enclosure formed by rigidly secured spaced wires with a portion of the wall having a door or gate formed therein together with means for supporting the cage in a suspended or elevated position. Exemplary of the prior art relating to bird cages are the following U.S. Pat. Nos.:

166,596
960,199
2,769,426
3,405,696
3,774,576
3,785,343

SUMMARY OF THE INVENTION

An object of the present invention is to provide a bird cage constructed of spaced, parallel wires which are inclined in a manner which will facilitate a bird grasping the wires and using them as a temporary perch with the cage being of triangular configuration for reception in the corner of a room or other enclosure.

Another object of the invention is to provide a bird cage in which the front of the cage is of arcuate configuration and a transparent shield of plastic or the like is provided for the upper portion of the front of the cage to protect the bird from cold air or air drafts which normally circulate in rooms especially when air conditioning is being used thereby reducing the possibility of the bird in the cage catching cold due to air circulation. The shield also protects the bird from germs which are discharged from the mouth of a person standing adjacent the cage thereby eliminating the possibility of the bird catching cold, influenza or the like from humans.

A further object of the invention is to provide a bird cage in accordance with the preceding objects in which the top and bottom of the cage is provided with an imperforate panel and a center removable panel is provided so that the cage may be oriented in a condition in which two vertically superimposed compartments are provided or in which a single vertically elongated compartment is provided.

Still another object of the invention is to provide a bird cage in accordance with the preceding objects in which the front wall of the cage is provided with an openable gate which is of triangular configuration and swings outwardly and downwardly about its lower edge so that it may form a perch immediately in front of the opening thus enabling the bird to be free to move in and out of the cage but also provide a perch adjacent the opening.

Yet another important object of the invention is to provide a bird cage in which one wall thereof is constructed of two hinged doors to facilitate cleaning of the cage and also facilitate access to the interior thereof which is necessary when feeding the bird or performing any other necessary function interiorly of the cage.

Yet a further important object of the invention is to provide a bird cage which is quite simple in construction and relatively inexpensive to manufacture but yet is provided with significant advantages to protect the health, well being and safety of the bird but yet enable the bird to enjoy the company of human beings and to enable human beings to see and enjoy the company of the bird.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the bird cage illustrating the structure of the cage and its relationship to the corner of a room.

FIG. 2 is a transverse, plan sectional view taken substantially upon a plane passing along section line 2—2 of FIG. 1 illustrating further structural details of the cage.

FIG. 3 is a vertical, sectional view taken substantially upon a plane passing along section line 3—3 of FIG. 2 illustrating further structural details of the cage.

FIG. 4 is a side elevational view of the cage taken from the side thereof which is provided with a pair of openable doors.

FIG. 5 is a fragmental sectional view taken along section line 5—5 of FIG. 4.

DESCRIPTION OF THE PREFERRED EMBODIMENT

Referring now specifically to the drawings, the bird cage of the present invention is generally designated by reference numeral 10 and is of triangular configuration for positioning in the corner of a room as defined by adjacent perpendicular walls 12 and 14. The cage may be supported in any suitable manner such as by a swingable bracket 16 secured to the wall 14 by a pivot bracket 18 and provided with a hook 20 at the outer end thereof for supporting the cage. The cage 10 may also be supported on a table, suspended from the ceiling or supported in any other manner. The triangular configuration enables the cage to be effectively positioned within the corner area of a room or other enclosure. For example, if the cage is being carried in an automobile or the like, the triangular configuration provides stability for the cage since it can be positioned at the intersection of the seat surface and interior wall of the automobile. While dimensional characteristics may vary, when the cage is used for receiving a parakeet or parakeets, it may be constructed with an overall height of approximately 18 inches and the dimensions of the side walls from the corner to the front may be 12 inches.

The bird cage 10 includes a generally triangular top wall or panel 22, a generally triangular bottom 24 and a generally triangular partition 26 oriented centrally between the top and bottom. The front edges of the top, bottom and partition are arcuate with the center of curvature being disposed at the apex of the panels defining the top, bottom and partition with the included angle between the side edges of the top 22 as well as the bottom 24 and partition 26 being approximately 90° as illustrated in FIG. 2.

Interconnecting the top, bottom and partition is a side wall generally designated by numeral 28, a side wall generally designated by numeral 30 and a front wall generally designated by numeral 32 with the side walls 28 and 30 being flat and the front wall 32 being arcuate and defining an enclosure for receiving a bird 33 such as a parakeet or the like. The top 22 of the cage is provided with a ring or loop 34 connected centrally thereto for engagement with a supporting hook 20 or any other supporting structure. The ring 34 is secured to a fastening device 36 and can fold downwardly adjacent the top 22 when not supporting the cage. The top 22, bottom 24 and partition 26 are all imperforate and preferably constructed of sheet metal but can also be constructed of wood, plastic or other material.

The wall 28 is defined by a plurality of parallel, equally spaced wires or rods 38 which are generally vertical in orientation but inclined in relation to the vertical as illustrated in FIG. 3. The upper and lower ends of the wire rods 38 are rigidly fixed to a peripheral flange 40 on the top 22 and a flange 42 on the bottom 24 with the center portion of the wire rods being free of the flange 44 on the partition 26. The wall 30 also is constructed of inclined wire rods 46 but these wire rods are constructed in the form of two gates or doors 48 and 50 provided with supporting hinges 52 at the apex of the cage or at the corner thereof so that the doors 48 and 50 may swing to an open position as illustrated in broken line in FIG. 2 to provide access to the interior of the cage. The outer edge of each of the doors or gates 48 and 50 is provided with a spring latch 54 to frictionally secure the door in closed position. This also enables the partition 26 to be removed by lifting the arcuate outer end thereof upwardly and then moving the partition 26 outwardly through the open side of the bird cage. This construction enables the cage to be converted from a cage having two compartments to a cage having a single compartment.

The front wall 32 includes an upper portion in the form of a transparent panel or shield 56 which is arcuate in configuration and extending from the partition 26 upwardly to the top 22 and completely across the arcuate front of the cage thus forming a closure for the upper front of the cage and enabling the bird 33 to be readily seen and to enable the bird to readily see out of the cage when in the upper compartment. This transparent shield may be constructed of glare-free plastic and may be completely transparent or may be tinted in any suitable color. The shield 56 may be removable for cleaning or replacement and effectively serves to protect the bird 33 from cold air drafts or the like. This is a problem when the cage is in a room which has air conditioning or is supported in other areas subject to air drafts which can cause the bird to catch cold, pneumonia or the like. The shield also protects the bird from germs which may be discharged by human beings breathing, coughing or sneezing in the direction of the bird. Birds, especially parakeets, frequently catch colds, influenza or the like from humans and this arrangement will eliminate this problem since the cage, when it is in a corner, will be more or less closed on the side walls with the transparent shield closing the front wall.

The lower portion of the front wall 32 is defined by a plurality of wire rods 58 which are inclined in one direction at one side of the front wall and wire rods 60 inclined in the opposite direction in the other portion of the front wall with a triangular gate 62 forming a closure for a correspondingly shaped opening in the front wall. As illustrated, the gate 62 is also formed by wire rods with heavier side edge rods 64 having elongated loops 65 hingedly connected to the flange 42 on the bottom 24 so that the gate 62 may swing downwardly to a substantially horizontal position or swing upwardly to a closed position with the apex of the gate including a hook 66 to retain the gate 62 in closed position. The wire rods 58 and 60 include portions which intersect above the apex of the gate but otherwise define a continuous wall of spaced, rigid wire rods. The hook 66 is dropped down into latching engagement with the intersecting wires 58 and 60. A decorative edge portion 68 in the form of a plurality of rigidly interconnected wire rings is provided at the top edge of the arcuate front of the top 22 and also along the top edge of the bottom panel 24 and generally in alignment with the top edge of the partition 26 with the decorative wire rings 68 being fixedly secured to the respective supporting wires 58 and 60 and the top panel 22.

The walls 28 and 30 are provided with a front-to-rear supporting rod in the form of a wire rod 70 for supporting the central partition 26. Thus, the complete interior enclosed by the bird cage is free of obstructions when partition 26 is removed with suitable perches, swings, feed receptacles, bathing appliances and the like provided as desired. A feed receptacle 74 is illustrated as being attached to the wire rods 46 on one of the doors 48 so that it is accessible to the bird 33 and so that it may be easily removed from the cage for cleaning and replenishing the supply of food.

Each vertical corner of the cage is provided with a frame member 76 in the form of an angle member having two equal flanges arranged generally in 90° relation to each other which is secured to the wire rods where it intersects the ends thereof and forms a retaining flange for the ends of the transparent panel or shield 56 and provides a mounting structure for the hinges 52 and a keeper for engagement by the latches 54. The wire rods and frame members may be constructed of relatively attractive material such as brass, anodized aluminum or the like which also will retain the bird cage of relatively light weight.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bird cage comprising a generally vertically disposed triangular configured enclosure adapted to be positioned in the corner of a room, or the like, said enclosure including a pair of vertically disposed planar side walls oriented in angular relation to each other with the intersection therebetween defining a rear corner of the enclosure, and a front wall of arcuate configuration interconnecting and extending between the outer end of the side walls, a generally triangular top imperforate member and triangular imperforate bottom member forming top and bottom closures for the area encompassed by the side walls and front wall, said enclosure including access means therein to enable ingress and egress of a bird and to enable feeding of the bird, bathing of the bird and cleaning the cage, each side wall being constructed from a plurality of generally parallel, equally spaced rods, said front wall being constructed with a spaced rod bottom portion and an imperforate transparent panel forming the top portion of the front wall, an imperforate partiton of generally triangular configuration centrally located between the top and bottom of the cage and generally aligned with the bottom edge of the imperforate transparent panel, and means removably supporting said partition in the cage for converting the cage from a single compartment cage to a two compartment cage, and providing a support for a bird inwardly of the imperforate transparent panel to protect the bird from cold air drafts and germs breathed toward the bird by human beings and the like.

2. The structure as defined in claim 1, wherein said access means includes one of said side walls being constructed as a pair of spaced rod gates having one vertical edge of each of the gates hingedly supported and the other vertical edge of each gate including latch means for retaining the gates in closed position and enabling access to both the upper and lower compartments of the cage and to enable the partition to be inserted into the cage and removed therefrom.

3. The structure as defined in claim 2, wherein said access means also includes a generally triangular spaced rod gate in the lower portion of the front wall, said triangular gate being hingedly supported from the bottom of the enclosure for downward swinging movement to an open position in generally outwardly extending relation to the front wall thereby forming an external perch for a bird, and means securing the apex of the triangular gate in closed position.

4. The structure as defined in claim 3, wherein each corner of the enclosure includes an angled frame member having flanges interconnecting the walls, the flanges at the upper front portion of the front wall defining retaining flanges for the transparent panel.

5. The structure as defined in claim 1, wherein said access means includes a pair of vertically aligned gates forming one of said side walls with the lower gate providing access to the compartment below the partition and the upper gate providing access to the compartment above the partition thereby enabling access directly into each compartment without movement of the imperforate transparent panel, said gates being pivotal about a common vertical axis with the top edge of the lower gate and the lower edge of the top gate generally aligned with the partition to enable access to the partition and removal and insertion of the partition through the opening defined by the gates when the gates are open, the bottom portion of the front wall having an opening therein with a pivotal gate hinged thereto along the bottom edge to enable access to the interior of the enclosure when the gates in the side wall are closed.

* * * * *